(12) United States Patent
Hudson et al.

(10) Patent No.: US 7,281,721 B2
(45) Date of Patent: Oct. 16, 2007

(54) SUSPENSION SYSTEM FOR DUMP TRUCK/PAVER TRUCK HITCH

(75) Inventors: Herbert D. Hudson, McKinney, TX (US); Cully B. Dodd, McKinney, TX (US); Thomas N. Chalin, Fairview, TX (US)

(73) Assignee: Watson & Chalin Manufacturing, Inc., McKinney, TX (US)

( * ) Notice: Subject to any disclaimer, the term of this patent is extended or adjusted under 35 U.S.C. 154(b) by 349 days.

(21) Appl. No.: 11/003,875

(22) Filed: Dec. 3, 2004

(65) Prior Publication Data

US 2006/0119061 A1 Jun. 8, 2006

(51) Int. Cl.
B62D 61/12 (2006.01)

(52) U.S. Cl. ............... 280/86.5; 280/81.6; 280/460.1

(58) Field of Classification Search ........... 280/86.5, 280/460, 460.1, 683, 81.6
See application file for complete search history.

(56) References Cited

U.S. PATENT DOCUMENTS

| | | | | |
|---|---|---|---|---|
| 2,186,996 | A * | 1/1940 | Short et al. ............... 301/6.5 |
| 2,882,067 | A * | 4/1959 | Gouirand ................. 280/683 |
| 3,138,392 | A * | 6/1964 | Holland .................. 280/447 |
| 3,213,769 | A * | 10/1965 | Smith ..................... 404/110 |
| 3,275,342 | A * | 9/1966 | Layton ................... 280/460.1 |
| 3,279,824 | A * | 10/1966 | Brisbin et al. ............ 280/460.1 |
| 3,304,101 | A * | 2/1967 | Layton ................... 280/460.1 |
| 3,515,411 | A * | 6/1970 | Layton ................... 280/460.1 |
| 3,542,397 | A * | 11/1970 | Files ...................... 280/460.1 |
| 3,704,896 | A * | 12/1972 | Buelow .................. 280/81.6 |
| 3,838,885 | A | 10/1974 | Brennan et al. |
| 3,880,393 | A | 4/1975 | Watson |
| 3,990,721 | A * | 11/1976 | Hoffman ................. 280/481 |
| 4,062,559 | A * | 12/1977 | Peters .................... 280/460.1 |
| 4,194,854 | A * | 3/1980 | Mauldin ................. 404/110 |
| 4,802,690 | A * | 2/1989 | Raidel ................. 280/124.157 |
| 4,880,279 | A * | 11/1989 | Flesche .................. 301/36.1 |
| 5,015,004 | A * | 5/1991 | Mitchell ................. 280/81.6 |
| 5,018,756 | A * | 5/1991 | Mitchell ................. 280/81.6 |
| 5,035,439 | A * | 7/1991 | Petrillo .................. 280/81.6 |
| 5,620,194 | A * | 4/1997 | Keeler et al. ............ 280/81.6 |
| 5,649,719 | A * | 7/1997 | Wallace et al. ........ 280/124.156 |
| 5,718,443 | A | 2/1998 | St. Onge |
| 5,823,629 | A | 10/1998 | Smith et al. |
| 6,073,946 | A | 6/2000 | Richardson |
| 6,116,698 | A | 9/2000 | Smith et al. |
| 6,293,570 | B1 | 9/2001 | Gottschalk et al. |
| 6,371,227 | B2 | 4/2002 | Bartlett |

(Continued)

*Primary Examiner*—Eric Culbreth
*Assistant Examiner*—Karen J. Amores
(74) *Attorney, Agent, or Firm*—Smith IP Services, P.C.

(57) ABSTRACT

A suspension system for a dump truck which is to be connected to a paver using a truck hitch. In one example, a system for connecting a dump truck to a paver includes a liftable and steerable suspension of the truck, the suspension having an adapter with a laterally outwardly facing concave side. A truck hitch of the paver engages the concave side of the adapter to attach the truck hitch to the suspension. In another example, a method of connecting a dump truck to a paver includes the steps of: interconnecting a hydraulic actuator between a frame of the truck and an axle of a suspension of the truck to thereby transmit a load from the frame to the axle; then raising a bed of the truck, the load increasing as the bed is raised; and increasing pressure in the hydraulic actuator in response to the increasing load.

19 Claims, 6 Drawing Sheets

U.S. PATENT DOCUMENTS

| | | |
|---|---|---|
| 6,557,875 B2 * | 5/2003 | Schlosser et al. ..... 280/124.153 |
| 6,899,348 B2 * | 5/2005 | Dodd ........................ 280/86.5 |
| 6,948,726 B2 * | 9/2005 | Dodd ........................ 280/86.5 |
| 7,131,652 B2 * | 11/2006 | Ramsey ..................... 280/86.5 |
| 2004/0007840 A1 * | 1/2004 | Boisture et al. ........... 280/86.5 |
| 2004/0056441 A1 * | 3/2004 | Chalin ...................... 280/86.5 |
| 2005/0093260 A1 * | 5/2005 | Trescott .................... 280/86.5 |
| 2006/0119061 A1 * | 6/2006 | Hudson et al. ............ 280/86.5 |

* cited by examiner

SUSPENSION SYSTEM FOR DUMP TRUCK/PAVER TRUCK HITCH

BACKGROUND

The present invention relates generally to vehicle suspension systems and, in an embodiment described herein, more particularly provides a suspension system for a dump truck which is to be connected to a paver using a truck hitch.

It is known to use a truck hitch to connect a paver to a dump truck. An example of such a truck hitch is described in U.S. Pat. No. 3,275,342, the entire disclosure of which is incorporated herein by this reference.

Figure 1:
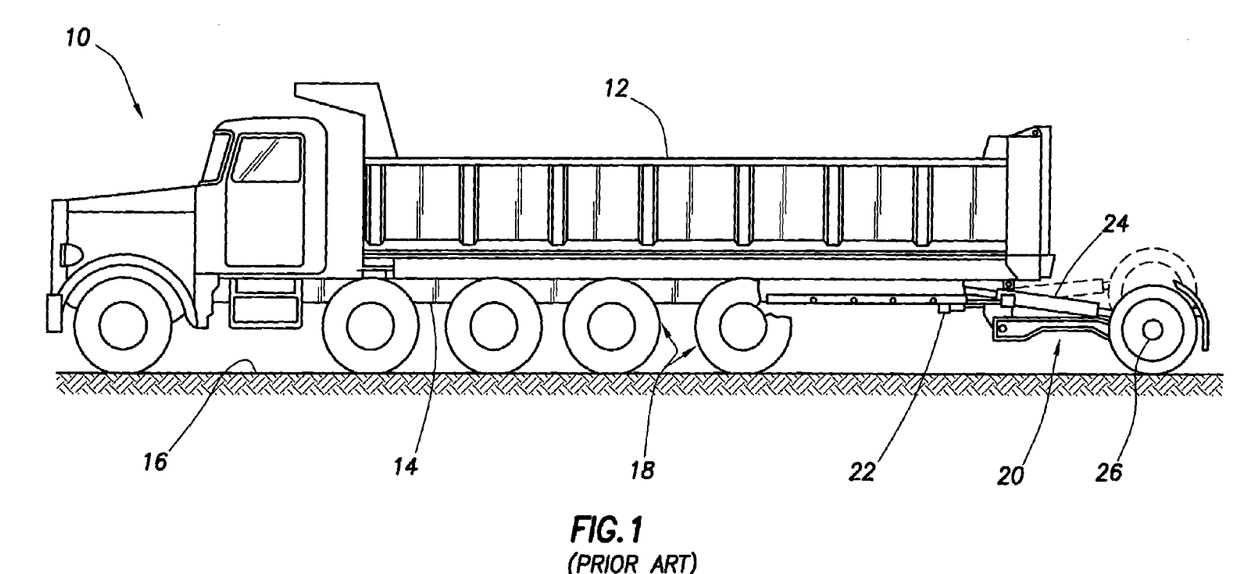
FIG. 1 is a side view of a prior art dump truck.

It is also known to use a steerable and liftable suspension on a dump truck which is to be connected to a paver using a truck hitch. An example of such a system is described in U.S. Pat. No. 5,718,443, the entire disclosure of which is incorporated herein by this reference. FIG. 1 of the present application corresponds to FIG. 1 of U.S. Pat. No. 5,718,443.

Depicted in FIG. 1 is a dump truck 10 having a liftable bed 12 for transporting material, such as paving material. The bed 12 is supported on a frame 14 which is, in turn, suspended above a road or ground surface 16 by multiple suspensions 18, including a steerable and liftable tag axle suspension 20. The suspension 20 helps to distribute the load transmitted from the truck 10 to the ground surface 16, for example, to comply with government regulations.

Unfortunately, in order for the truck 10 to be properly connected to a paver while the bed 12 is raised to dump the material from the bed into the paver, the tag axle suspension 20 must be retracted beneath the bed. This necessitates use of an expensive and heavy retraction mechanism 22. Furthermore, as the material is dumped from the bed 12, the load on the suspension 20 will decrease, causing a pneumatic cylinder 24 of the suspension to elongate and raise the rear end of the truck 10, thereby very undesirably changing the position of the bed 12 relative to the paver during the dumping operation.

This latter deficiency is attempted to be remedied by positioning a rigid support between the frame 14 and an axle 26 of the suspension 20 prior to the dumping operation, and then deactivating the pneumatic cylinder 24. However, this means that the suspension 20 becomes almost entirely noncompliant during the dumping operation. Most significantly, as the bed 12 is raised, a majority of the weight of the material and the bed is transferred to the rear of the truck 10 and, via the rigid support, directly onto the axle 26. This requires that a more expensive, heavier and higher capacity axle 26 be used in the suspension 20.

In addition, with the suspension 20 deployed as shown in FIG. 1, the effective wheelbase of the truck 10 is very long, making the truck less maneuverable. Also, due to the heavy retraction mechanism 22 and heavy axle assembly 26, as well as other components of the suspension 20, the truck 10 has a relatively large tare weight, and is expensive to produce and maintain.

Figure 2:
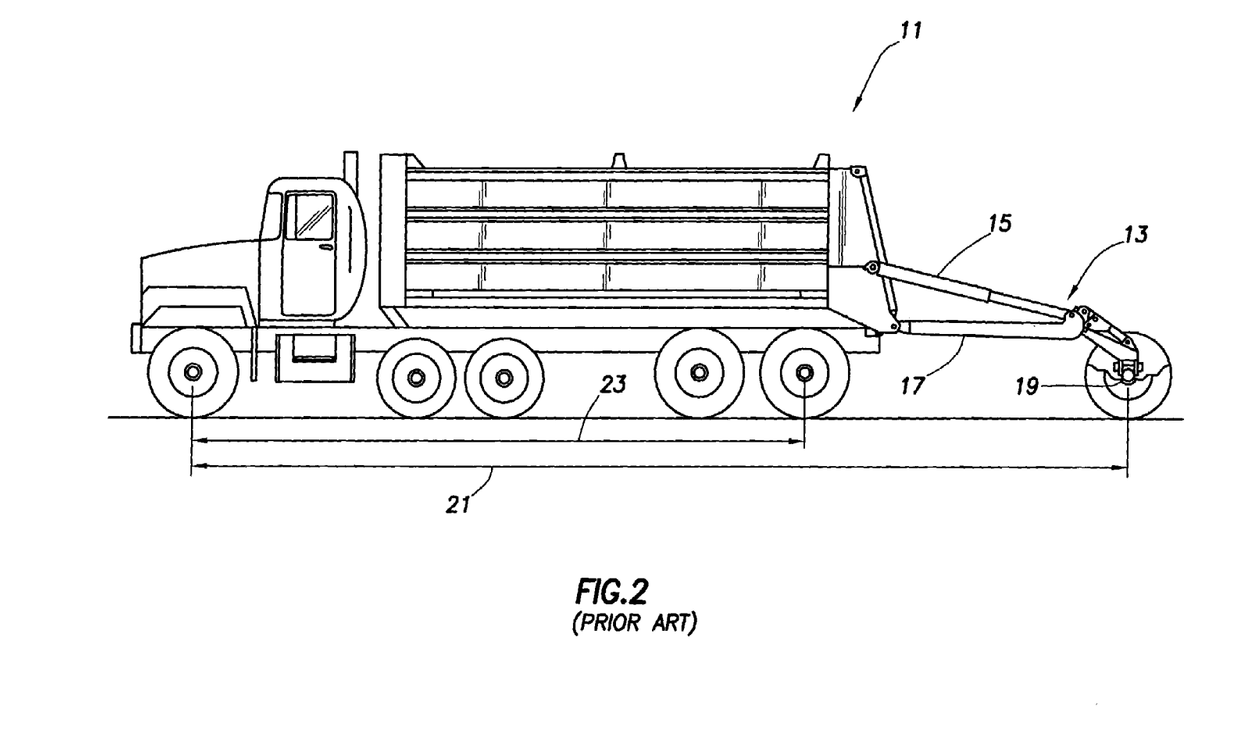
FIG. 2 is a side view of another prior art dump truck.

In FIG. 2 another truck 11 is depicted which utilizes a steerable and liftable tag axle suspension 13. FIG. 2 of the present application corresponds to FIG. 1 of U.S. Pat. No. 6,116,698, the entire disclosure of which is incorporated herein by this reference.

The suspension 13 may be lifted up and out of the way when connecting a paver hitch to the truck 11, but it still suffers from much the same disadvantages as the truck 10 of FIG. 1. The suspension 13, including at least actuators 15, pivot arms 17 and an axle assembly 19, are very heavy and expensive to produce and maintain. When the suspension 13 is deployed, a wheelbase 21 of the truck 11 is greatly increased over the front-to-rear axle length 23 prior to deployment. Thus, the truck 11 is much less maneuverable with the suspension 13 deployed, the truck has a relatively large tare weight, and the suspension is expensive to produce and maintain.

Therefore, it may be clearly seen that a need exists for an improved suspension system for a dump truck which is to be connected to a paver. It is an object of the present invention to provide such a suspension system.

SUMMARY

In carrying out the principles of the present invention, in accordance with one of multiple embodiments described below, a suspension system for a dump truck which is to be connected to a paver using a truck hitch is provided. The suspension system solves the above problems in the art and enables the use of a lighter weight, more efficient, steerable and liftable suspension on the dump truck. This results in the truck having a lower tare weight, less cost, and greater maneuverability.

In one aspect of the invention, a system for connecting a dump truck to a paver is provided. The system includes a liftable and steerable suspension of the truck. The suspension has a wheel attached to an outer face of a hub, a tire having a vertical centerline positioned laterally inward of the hub outer face, and an adapter attached to the wheel, the adapter having a laterally outwardly facing concave side.

The paver has a truck hitch. The truck hitch includes a laterally inwardly extending engagement device which engages an interior of the concave side of the adapter to attach the truck hitch to the suspension.

In another aspect of the invention, a method of connecting a dump truck to a paver is provided. The method includes the steps of: interconnecting a hydraulic actuator between a frame of the truck and an axle of a suspension of the truck to thereby transmit a load from the frame to the axle; then raising a bed of the truck to thereby transfer material from the bed to the paver, the load increasing as the bed is raised; and increasing pressure in the hydraulic actuator in response to the increasing load transmitted from the frame to the axle.

These and other features, advantages, benefits and objects of the present invention will become apparent to one of ordinary skill in the art upon careful consideration of the detailed description of representative embodiments of the invention hereinbelow and the accompanying drawings.

DETAILED DESCRIPTION

Figure 3:
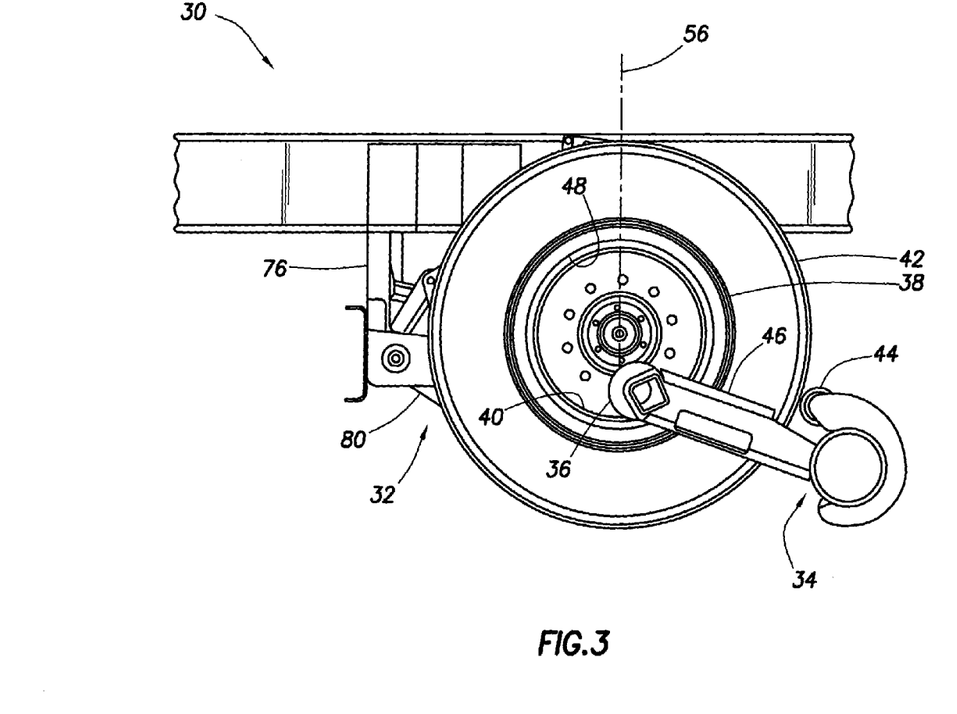
FIG. 3 is a side view of a system for connecting a dump truck to a paver truck hitch, the system embodying principles of the present invention.

Representatively illustrated in FIG. 3 is a system 30 for connecting a dump truck to a paver which embodies principles of the present invention. In the following description of the system 30 and other apparatus and methods described herein, directional terms, such as "above", "below", "upper", "lower", etc., are used for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention. The embodiments are described merely as examples of useful applications of the principles of the invention, which is not limited to any specific details of these embodiments.

The system 30 is depicted in FIG. 3 as including a unique steerable and liftable suspension 32 attached to the frame 14 of the truck 10 described above, in place of the tag axle suspension 20. However, it should be clearly understood that the suspension 32 can be used on other vehicles, and on other types of vehicles, in keeping with the principles of the invention. For example, the suspension 32 could be used in place of the tag axle suspension 13 on the truck 11, or on another vehicle.

Also depicted in FIG. 3 is a truck hitch 34 of a paver (such as the paver described in the incorporated U.S. Pat. No. 3,275,342). Any paver and/or any truck hitch can be used in place of that shown in FIG. 3, without departing from the principles of the invention.

In this view, it may be seen that an engagement device 36 (e.g., a roller) of the truck hitch 34 projects inwardly into an adapter 38 and contacts an outwardly facing concave side 40 of the adapter. This engagement prevents the truck 10 from rolling away from the paver as the paver pushes against a tire 42 using a roller 44. Another roller 46 laterally aligns the truck hitch 34 with the suspension 32 by contacting an outwardly facing flange 48 formed on the adapter 38.

Figure 4:
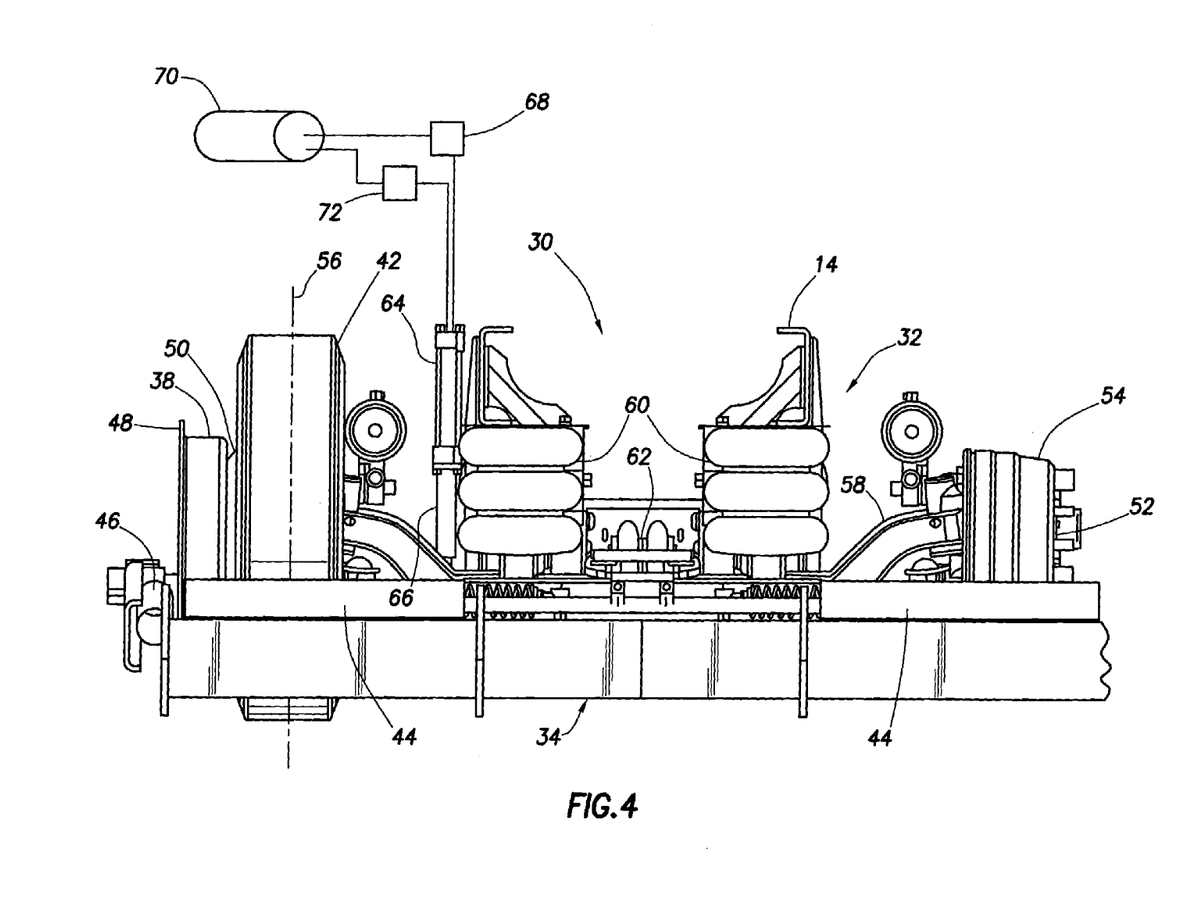
FIG. 4 is a rear view of the system of FIG. 3.

The system 30 is depicted from a rear view in FIG. 4. In this view, the general shape of the adapter 38 can be seen. The adapter 38 is outwardly concave and is attached to a wheel 50 on which the tire 42 is mounted. The adapter 38 and wheel 50 are attached to an outer face 52 of a hub 54.

In one unique feature of the invention, a vertical centerline 56 of the single tire 42 on each side of the suspension 32 is laterally inwardly positioned relative to the outer face 52 of the hub 54. This reduces end loading moments on an axle 58 of the suspension 32, enabling the axle to have a relatively light weight construction.

Air springs 60 are used in the suspension 32 to suspend the frame 14 above the axle 58. Increased pressure applied to the air springs 60 operates to raise the frame 14 relative to the axle 58. A steering lockout mechanism 62 is used to prevent the suspension 32 from steering (i.e., to prevent the wheels 50 from pivoting relative to the axle 58) while the truck 10 is backing up, or while the paver is pushing the truck.

Note that, although some elements of the suspension 32 are shown in the drawings only on one side of the suspension, it will be readily appreciated that the suspension is the same on each lateral side. Thus, although in FIG. 4 only one adapter 48, wheel 50 and tire 42 are shown on the left side of the suspension 32, in actual practice another adapter, wheel and tire will be attached to the hub 54 on the right side of the suspension.

Another unique feature of the system 30 visible in FIG. 4 is the hydraulic actuator 64. Prior to raising the bed 12, the hydraulic actuator 64 is pressurized, and then pressure in the air springs 60 is reduced. At this point, a rod 66 of the actuator 64 contacts the axle 58 and transmits a load from the frame 14 to the axle.

The hydraulic actuator 64 prevents the rear end of the truck 10 from raising as the load decreases (i.e., as the material is dumped from the bed 12). For example, when the rod 66 of the actuator 64 contacts the axle 58, it may be at or near the end of its stroke, so that the length of the actuator will not increase appreciably when the load decreases.

However, unlike the rigid support described in the incorporated U.S. Pat. No. 5,718,443, the hydraulic actuator 64 is compliant and can be used to adjust what proportion of the load is applied to the axle 58, and what proportion of the load is carried by the other suspensions 18.

For example, when the bed 12 is first raised, the load applied to the rear of the frame 14 increases substantially. To prevent damage to the axle 58 a pressure regulator 68 may be used to prevent the load transmitted from the frame 14 to the axle 58 from exceeding a predetermined maximum. If the predetermined maximum load is about to be exceeded, the pressure regulator 68 will bleed fluid from the hydraulic actuator 64 to an accumulator 70.

Bleeding fluid from the hydraulic actuator 64 will enable more of the load to be supported by the other suspensions 18. It is conceived that this will only occur in extreme situations, such as when the truck 10 has been overloaded, the material is more dense than expected, etc.

A pump 72 is used to pressurize the hydraulic actuator 64 prior to relieving air pressure from the air springs 60 and raising the bed 12. Preferably, the pump 72 extends the hydraulic actuator 64 to somewhat less than, but very near, its full stroke. As the bed 12 raises and the load then decreases, the rise is limited to the remaining stroke of the actuator 64.

Note that it is not necessary in keeping with the principles of the invention for fluid to be bled from the hydraulic actuator 64 by the pressure regulator 68 when the bed 12 is raised or when the load on the suspension system 32 is otherwise increased. For example, fluid may be retained in the actuator 64 to help support the rear of the frame 14. However, this may require use of a higher capacity axle 58 and perhaps a larger actuator 64, etc.

Figure 5:
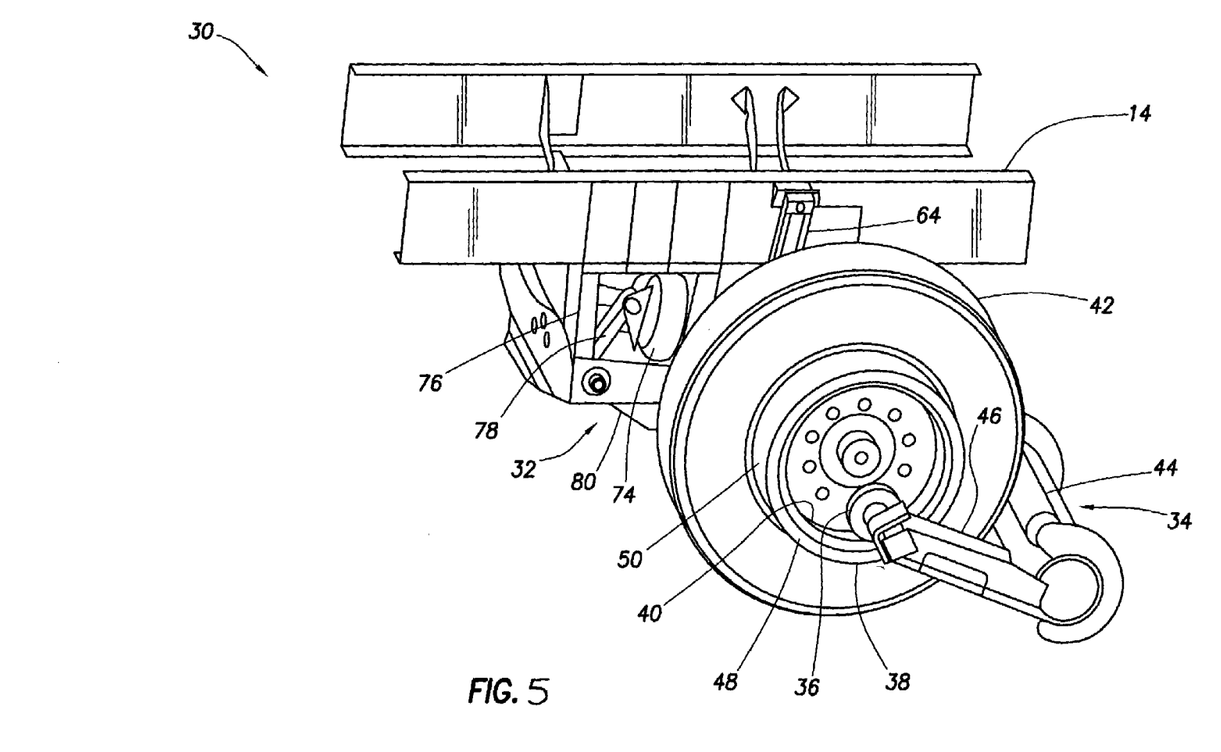
FIG. 5 is an isometric view of the system of FIG. 3.

An isometric view of the system 30 is shown in FIG. 5. In this view, a more detailed perspective may be had of the manner in which the truck hitch 34 engages the suspension 32. In addition, the manner in which the axle 58 is lifted using lift bags 74 positioned within hanger brackets 76 attached to the frame 14 can be viewed. When pressurized, the lift bags 74 push against lever arms 78 attached to pivot arms 80 pivotably connected to the hanger brackets 76 and the axle 58.

Figure 6:
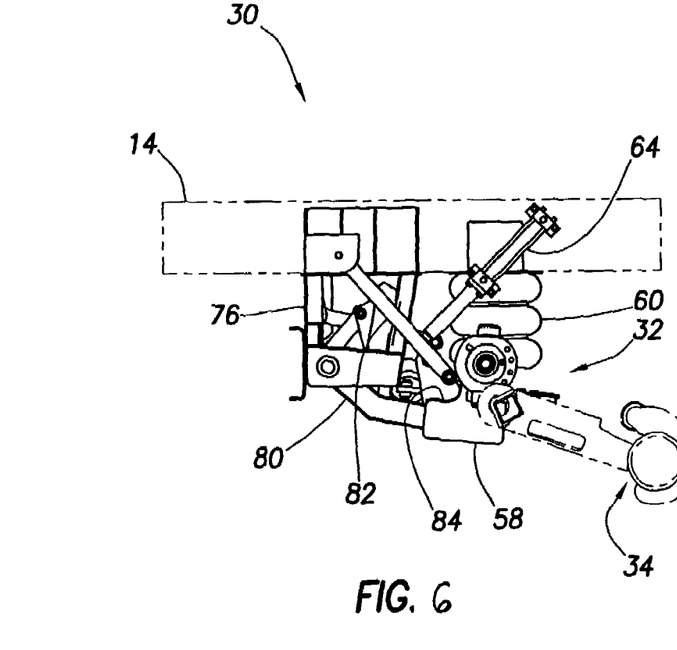
FIG. 6 is a side view of a first alternate configuration of the system of FIG. 3.

In FIG. 6, one possible configuration of the system 30 is depicted. In this configuration, the hydraulic actuator 64 is pivotably connected between the frame 14 and an arm 82 which is also pivotably connected to the frame via the hanger bracket 76. When the hydraulic actuator 64 is pressurized, it extends downwardly, pivoting the arm 82 downwardly into contact with a surface 84 on the axle 58.

The arm 82 and the hydraulic actuator 64 transmit the load from the frame 14 to the axle 58 as the bed 12 is raised and the material in the bed is dumped. Note that the arm 82 contacts the surface 84 longitudinally between the pivot connection of the arm 82 to the frame 14 and the pivot connection of the hydraulic actuator 64 to the frame. However, this contact with the surface 84 could be otherwise positioned in keeping with the principles of the invention.

Figure 7:
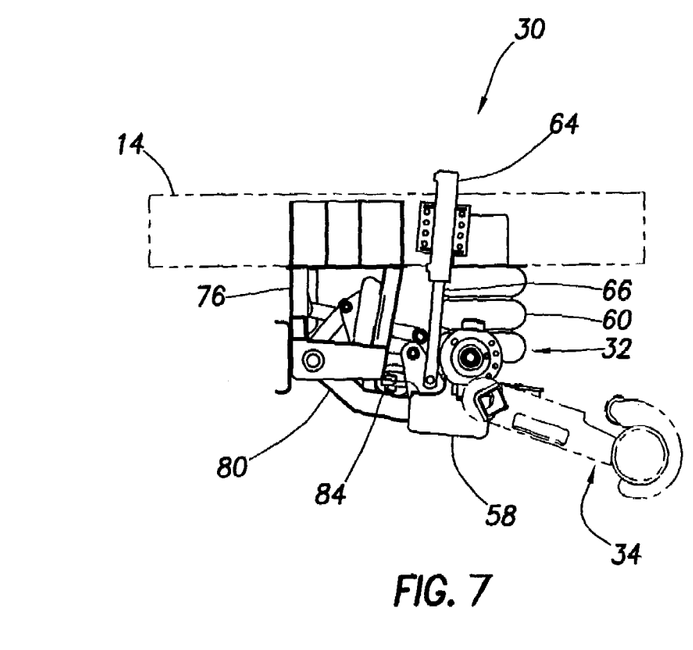
FIG. 7 is a side view of a second alternate configuration of the system of FIG. 3.

In the configuration depicted in FIG. 7, the actuator 64 is rigidly attached to the frame 14. When pressurized, the actuator rod 66 extends downwardly into contact with the surface 84 to transmit the load from the frame 14 to the axle 58. Note that the rod 66 contacts the surface 84 somewhat longitudinally forward of the connection between the actuator 64 to the frame. However, this contact with the surface 84 could be otherwise positioned in keeping with the principles of the invention.

Of course, a person skilled in the art would, upon a careful consideration of the above description of representative embodiments of the invention, readily appreciate that many modifications, additions, substitutions, deletions, and other changes may be made to these specific embodiments, and such changes are within the scope of the principles of the present invention. Accordingly, the foregoing detailed description is to be clearly understood as being given by way of illustration and example only, the spirit and scope of the present invention being limited solely by the appended claims and their equivalents.

What is claimed is:

1. A system for connecting a dump truck to a paver, the system comprising:
   a first liftable and steerable suspension of the truck, the first suspension comprising a wheel attached to an outer face of a hub, a tire having a vertical centerline positioned laterally inward of the hub outer face, and an adapter attached to the wheel, the adapter having a laterally outwardly facing concave side; and
   a truck hitch of the paver, the truck hitch including a laterally inwardly extending engagement device which engages an interior of the concave side of the adapter to attach the truck hitch to the first suspension.

2. The system of claim 1, wherein the engagement device is a roller which contacts the interior of the concave side of the adapter when the truck hitch is attached to the first suspension.

3. The system of claim 1, wherein the adapter has a flange attached to the concave side, and wherein the truck hitch further includes a roller which contacts the flange to laterally position the truck hitch relative to the first suspension when the truck hitch is attached to the first suspension.

4. The system of claim 1, wherein the first suspension further comprises an air spring which is pressurized to suspend a frame of the truck above an axle of the first suspension.

5. The system of claim 4, wherein pressure in the air spring is reduced when a bed of the dump truck is raised to dump material into the paver.

6. The system of claim 5, wherein a hydraulic actuator of the first suspension is pressurized to transfer load from the frame to the axle when pressure in the air spring is reduced.

7. The system of claim 6, wherein the hydraulic actuator is attached to the frame and extends downwardly to contact the axle when the hydraulic actuator is pressurized.

8. The system of claim 6, wherein the hydraulic actuator is pivotably attached between the frame and an arm, the arm pivoting downwardly to contact the axle when the hydraulic actuator is pressurized.

9. The system of claim 6, further comprising a pressure regulator connected to the hydraulic actuator, the pressure regulator preventing more than a maximum predetermined load from being applied from the frame to the axle.

10. The system of claim 9, wherein the pressure regulator bleeds fluid from the hydraulic actuator to prevent the maximum predetermined load from being applied from the frame to the axle.

11. The system of claim 10, wherein a load transmitted from the frame to one or more second suspension of the truck is increased when the pressure regulator bleeds fluid from the hydraulic actuator.

12. A method of connecting a dump truck to a paver, the method comprising the steps of:
   interconnecting a hydraulic actuator between a frame of the truck and an axle of a first suspension of the truck to thereby transmit a load from the frame to the axle;
   then raising a bed of the truck to thereby transfer material from the bed to the paver, the load increasing as the bed is raised; and
   increasing pressure in the hydraulic actuator in response to the increasing load transmitted from the frame to the axle, and
   wherein the interconnecting step further comprises attaching the actuator to the frame and positioning the actuator to extend downwardly into contact with the axle when pressure in the actuator is increased prior to raising the bed.

13. The method of claim 12, further comprising the step of regulating pressure in the hydraulic actuator to thereby prevent the load transmitted from the frame to the axle from exceeding a predetermined maximum load.

14. The method of claim 13, wherein the pressure regulating step further comprises bleeding fluid from the hydraulic actuator to prevent the load transmitted from the frame to the axle from exceeding the predetermined maximum load.

15. The method of claim 14, further comprising the step of increasing a load transmitted from the frame to a second suspension of the truck in response to the step of bleeding fluid from the hydraulic actuator.

16. The method of claim 12, further comprising the step of pressurizing an air spring of the first suspension to thereby suspend the frame above the axle.

17. The method of claim 16, further comprising the step of depressurizing the air spring prior to the step of raising the bed.

18. A method of connecting a dump truck to a paver, the method comprising the steps of:
   interconnecting a hydraulic actuator between a frame of the truck and an axle of a suspension of the truck to thereby transmit a load from the frame to the axle;
   then raising a bed of the truck to thereby transfer material from the bed to the paver, the load increasing as the bed is raised; and
   increasing pressure in the hydraulic actuator in response to the increasing load transmitted from the frame to the axle, and
   wherein the interconnecting step further comprises pivotably connecting the actuator between the frame and an arm, whereby the arm extends downwardly into contact with the axle when pressure in the actuator is increased prior to raising the bed.

19. A method of connecting a dump truck to a paver, the method comprising the steps of:
   interconnecting a hydraulic actuator between a frame of the truck and an axle of a suspension of the truck to thereby transmit a load from the frame to the axle;
   then raising a bed of the truck to thereby transfer material from the bed to the paver, the load increasing as the bed is raised;

increasing pressure in the hydraulic actuator in response to the increasing load transmitted from the frame to the axle; and engaging a truck hitch of the paver with an interior of a concave side of an adapter attached to a wheel of the suspension, the wheel being attached to an outer face of a hub and having a tire mounted thereon, the tire having a vertical centerline positioned laterally inward of the hub outer face.

* * * * *